May 9, 1961 J. D. WILSON Re. 24,984

NESTING AND STACKING TRAYS

Original Filed June 18, 1956 4 Sheets-Sheet 1

JAMES DUNCAN WILSON,
INVENTOR.

BY HIS ATTORNEYS

HARRIS, KIECH, FOSTER & HARRIS

NESTING AND STACKING TRAYS

Original Filed June 18, 1956 4 Sheets-Sheet 2

JAMES DUNCAN WILSON,
INVENTOR.
BY HIS ATTORNEYS:
HARRIS, KIECH, FOSTER & HARRIS.

NESTING AND STACKING TRAYS

Original Filed June 18, 1956 4 Sheets-Sheet 3

JAMES DUNCAN WILSON,
INVENTOR.

BY HIS ATTORNEYS
HARRIS, KIECH, FOSTER & HARRIS.

NESTING AND STACKING TRAYS

Original Filed June 18, 1956 4 Sheets-Sheet 4

JAMES DUNCAN WILSON,
INVENTOR.
BY HIS ATTORNEYS:
HARRIS, KIECH, FOSTER & HARRIS.

United States Patent Office

Re. 24,984
Reissued May 9, 1961

24,984

NESTING AND STACKING TRAYS

James D. Wilson, Long Beach, Calif., assignor to Banner Metals, Inc., Compton, Calif., a corporation of Ohio Original No. 2,925,919, dated Feb. 23, 1960, Ser. No. 591,827, June 18, 1956. Application for reissue Oct. 28, 1960, Ser. No. 65,877

5 Claims. (Cl. 211—126)

Matter enclosed in heavy brackets [ ] appears in the original patent but forms no part of this reissue specification; matter printed in italics indicates the additions made by reissue.

This invention relates to trays and in particular to trays which may be stacked one upon the other when loaded and which may be nested one within the other when empty.

It is an object of the invention to provide a tray which may be stacked vertically upon a similar tray and which may be nested within a similar tray without turning one of the trays ninety degrees with respect to the other, the nested trays meeting along horizontal surfaces so that no wedging action occurs. A further object of the invention is to provide such a tray which may be so nested and stacked without requiring any moving parts, such as bails or the like.

It is another object of the invention to provide stacking and nesting trays with each tray having means for indexing or centering it with respect to the trays stacked above and below it so that the stack is maintained in vertical alignment, and with each tray having means for indexing or centering it with respect to trays nested above and below it so that the nested trays will be maintained in vertical alignment.

It is a further object of the invention to provide a tray which may be nested with a plurality of identical trays with each tray resting on side rails of the next tray below and resting on the end rails of the nth tray below, n being a small whole number.

It is another object of the invention to provide a stacking and nesting tray having parallel upper end rails which provide for sliding engagement with the tray stacked above, which serve to support and center the tray stacked above and which are used as handles in moving the tray from one point to another.

It is a further object of the invention to provide a stacking and nesting tray which is suitable for handling products such as loaves of bread or the like, the tray having open ends and a bottom with spaced parallel ridges extending from one end to the other so that the tray may be easily loaded while stacked with a plurality of similar trays.

It is another object of the invention to provide a stacking and nesting tray suitable for use with square milk cartons or the like, the tray being provided with a centrally positioned band which together with the bottom of the tray serves to define a rectangular space having vertical upstanding sides.

The invention also comprises novel details of construction and novel combinations and arrangements of parts, which will more fully appear in the course of the following description. The drawings merely show and the description merely describes preferred embodiments of the present invention which are given by way of illustration or example.

Figure 1:
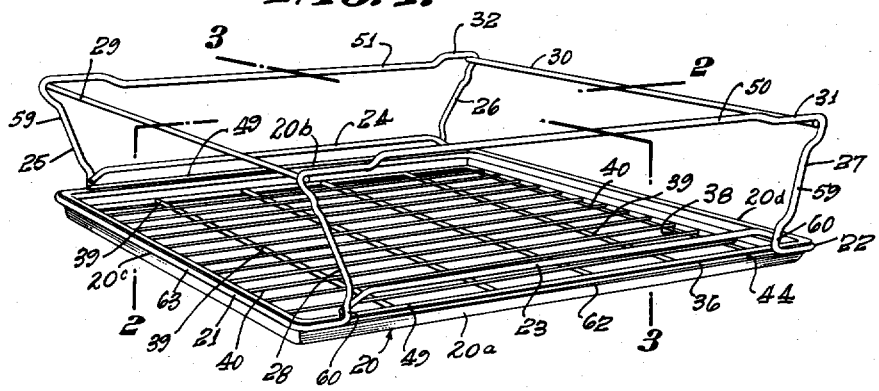
Fig. 1 is an isometric view of a preferred embodiment of the invention.
Figure 2:
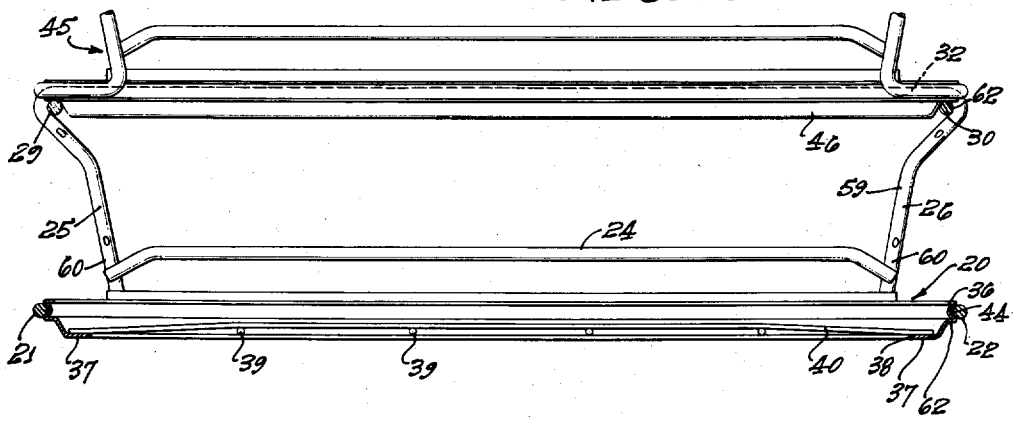
Fig. 2 is a sectional view taken along the line 2—2 of Fig. 1, with a portion of a second tray stacked on top of the first tray.
Figure 3:
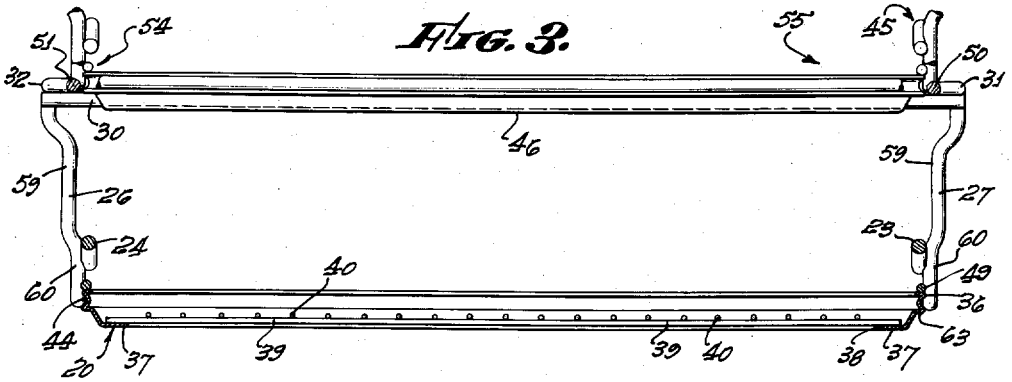
Fig. 3 is a sectional view taken along the line 3—3 of Fig. 1, with a portion of a second tray stacked on top of the first tray.
Figure 4:
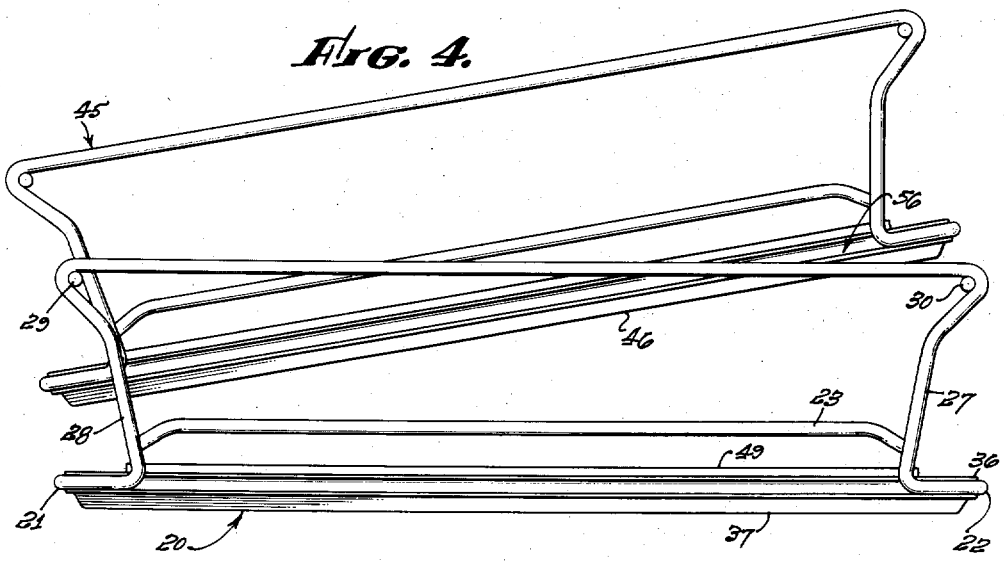
Fig. 4 is a side view showing the tray of Fig. 1 being nested with an identical tray.
Figure 5:
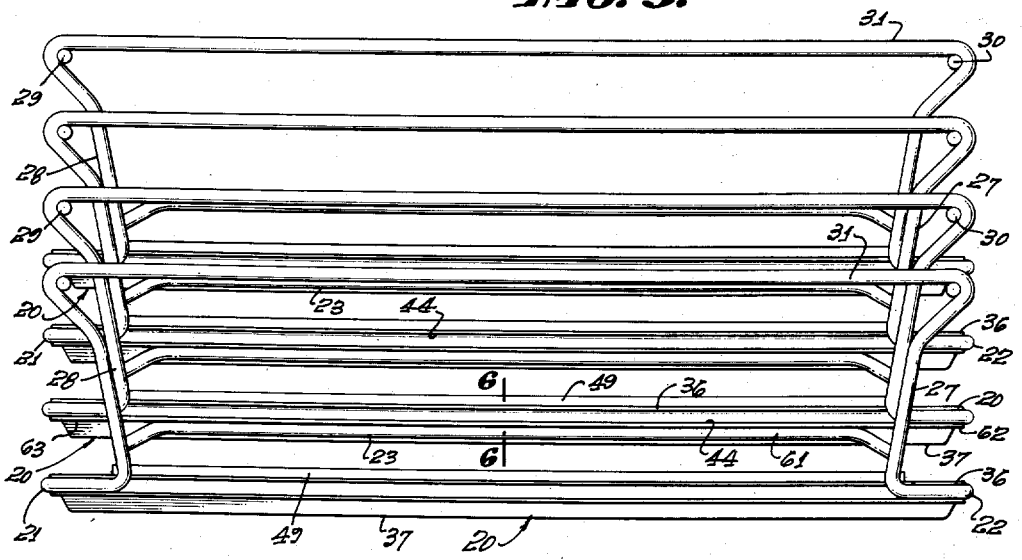
Fig. 5 is a side view showing a plurality of the trays of Fig. 1 nested together.
Figure 6:
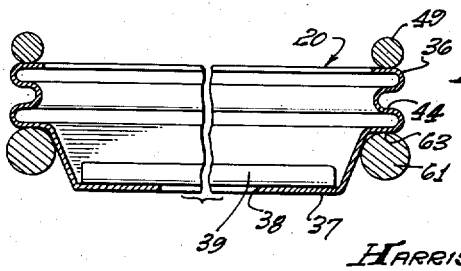
Fig. 6 is a partial sectional view taken along the line 6—6 of Fig. 5.

The embodiment shown in Figs. 1 through 6 includes a tray bottom unit 20 having opposite spaced sides 20a and 20b and opposite spaced ends 20c and 20d. The tray bottom unit carries lower end rails 21, 22. Lower side rails 23, 24 are disposed in spaced relation above the tray bottom unit laterally inward from the sides 20a and 20b of the tray bottom unit. Rigid upstanding members 25, 26, 27, 28 extend up from the tray bottom unit and at their upper ends are connected to upper end rails 29, 30 and upper side rails 31, 32. The upper end rails 29, 30 constitute the opposite ends and the side rails 31, 32 constitute the opposite sides of a tray top unit which is open. The ends and sides of the tray top unit are in spaced, substantially parallel relationship to the ends and sides of the tray bottom unit. The upstanding members and the rails are preferably manufactured from steel rod or the like, the rod being formed to the desired configuration and welded in position. The tray bottom unit 20 is preferably formed from a rectangular piece of sheet metal with an upstanding edge 36 around the periphery and a depressed central portion 37 having an opening 38 therein. This preferred form of the bottom is best seen in Figs. 2, 3 and 6. The opening 38 is covered by an open grid consisting of parallel spaced rods 39 resting on the central portions 37 of the bottom and extending from one side to the other of the opening 38 and parallel spaced rods 40 resting on the central portion 37 and on the rods 39 and extending from one end to the other of the opening 38. The open grid permits small particles to drop through the tray, thereby aiding in keeping the tray clean. The parallel spaced rods 40 are advantageous in that they serve as runners and guides for objects, such as loaves of bread, being loaded into the tray through the space between the upper and lower end rails.

The upstanding edge 36 of the bottom is corrugated in shape to increase the rigidity of the structure. This corrugated form includes a concave section 44 in which the end rails 21, 22 are positioned, as seen in Fig. 2. In this embodiment, the end rail 21 is wrapped around the adjacent corners of the bottom 20 and is formed integrally with the vertical members 25, 28 which are attached to the sides of the bottom at corresponding points set back from the corners thereof. The construction at the opposite end of the tray is identical to that just described.

Referring now to Fig. 2, the upper ends of the upstanding members 25 and 26 are spaced further apart than the lower ends thereof, the distance between the upper ends being such that the distance between the upper end rails 29 and 30 carried by the upstanding members 25 and 26 respectively, is slightly greater than the end to end dimension of the depressed portion 37 of the tray bottom 20 and less than the spacing between the end rails 21, 22 on the tray bottom. The upstanding members 28 and 27 are identical to the upstanding members 25 and 26. A second tray 45, which is identical to the tray described, may be stacked on top of the first tray with its bottom resting on the upper end rails 29 and 30 of the first tray and with the depressed portion 46 thereof positioned between the upper end rails 29 and 30 of the first tray, thereby providing vertical alignment of the two stacked trays.

Referring now to Fig. 3, the upper ends of the upstanding members 26 and 27 at one end of the tray are spaced further apart than the lower ends thereof and the upstanding members 25 and 28 at the opposite end of the tray have corresponding configurations. The lower side rail 23 is carried between the upstanding members 27 and 28 spaced upward from the bottom of the tray. A rod 49 is carried between the upstanding members 27 and 28 along the side edge 36 of the tray bottom to increase the strength of the structure. The upper side rail 31 is formed integrally with the upstanding members 27 and 28, the upper side rail having a central portion 50 which extends laterally inward of the remainder of the upper side rail so that the distance between the central portion 50 and a corresponding central portion 51 of the upper side rail 32 is just slightly greater than the over-all side-to-side dimension of the tray bottom 20. Thus when the second tray 45 is stacked on the first tray and is resting on and positioned between the upper end rails 29 and 30 it will also be positioned between the central portions 50 and 51, thereby providing indexing or centering in two directions normal to each other so that the stacked trays will be a vertical interlocked structure.

The tray of the invention may be lifted by using the upper end rails 29 and 30 as handles. In carrying out the stacking operation, a lower edge of the tray held by the operator, such as the edge 54 of the tray 45 of Fig. 3, is rested on that portion of the upper end rails in the zone indicated by the arrow 55 of Fig. 3 with the overhanging portion of the upper tray being supported by the operator. Then the upper tray is slid along the upper end rails to the left as viewed in Fig. 3 until the upper tray drops into the center position.

Two trays may be nested one within the other by tilting the upper tray 45 as shown in Fig. 4 so that its bottom 56 will pass between the upper end rails 29, 30 of the lower tray. Then the bottom of the upper tray will rest on the lower side rails 23 and 24 of the lower tray, as seen in Figs. 5 and 6. The distance between the lower side rails 23, 24 is slightly greater than the over-all side-to-side dimension of the depressed central portion 37 of the bottom of the tray so that the upper tray will be positioned and centered in vertical alignment with the lower tray. The upward flaring of the vertical member 26 and 27 described above and shown in Fig. 3 permits the upper tray to be supported on the lower side rails of the lower tray with the contact surface between the two trays lying in a horizontal plane so that there is no wedging action occurring which would make the nested trays difficult to separate. Each of the vertical members is formed with a portion 59 (Fig. 3) offset outward from a lower portion 60 a distance less than the width of the lower portion 60 and with both portions 59 and 60 lying in a common plane (Fig. 2). The positions of the lower side rails with respect to the bottom of the tray and the slope of the plane in which the portions 59 and 60 of the vertical members lie are selected so that when one tray is nested within another, as shown in Fig. 5, the upper tray will not quite engage the vertical members of the tray below, thereby providing end-to-end centering for maintaining the nested trays in vertical alignment.

Four identical trays are shown nested together in Fig. 5 with the bottom of each tray resting on the lower side rails of the tray immediately below it. The vertical distance between the upper surfaces of the upper end rails 29 and 30 and the surface 62 of the bottom which rests on the upper end rails of the next lower tray when stacked is three times greater than the distance between the upper surface of the lower side rails 23, 24 and the surface 63 of the bottom which rests on the lower side rails of the next tray below when nested. Then when four or more identical trays are nested as seen in Fig. 5, each of the trays except the lower three will be resting on both the lower side rails of the tray immediately beneath it and on the upper end rails of the third tray beneath it, thereby increasing the rigidity and strength of the nested structure and permitting a larger number of trays to be nested together. The 3 to 1 ratio of vertical distances described above can of course be any small whole number such as 2, 3, 4, 5, or the like.

An alternative embodiment of the invention which is especially adapted to transport square-shaped milk cartons or the like is shown in Figs. 7 through 11. This embodiment comprises a tray 70 having a bottom unit 71 having opposite spaced sides 71a and 71b and opposite spaced ends constituted by lower end rails 72, 73. Lower side rails 74, 75 are disposed in spaced relation above the tray bottom unit. Rigid upstanding members 76, 77, 78, 79 extend up from the tray bottom unit and at their upper ends are connected to an open tray top unit composed of upper end rails 80, 81 and upper side rails 82, 83. An intermediate band 84 extends around the upstanding members 76—79 between the tray bottom unit 71 and the tray top unit 80—83. This tray may be manufactured in the manner described in conjunction with the embodiment of Fig. 1. The bottom 71 comprises a rectangular sheet 87 (Fig. 8) having a turned-up edge 88 and a large central opening 89 with a sheet 90 having an over-all pattern of diamond-shaped openings therein mounted on the sheet 87.

The lower end rail 72 is U-shaped having a center arm 93 and side arms 94, 95 with the three arms lying in a horizontal plane. The bottom 71 is positioned between the side arms 94 and 95 with the center arm 93 spaced from the turned-up edge of the bottom. In the embodiment shown in Fig. 7, the upstanding members 76 and 77 are formed integrally with the side arms 94 and 95, respectively, of the lower end rail and extend upward from the sides of the bottom 71 at points set back from the corners of the bottom. The construction of the other end of the tray is identical to that just described.

Figure 8:
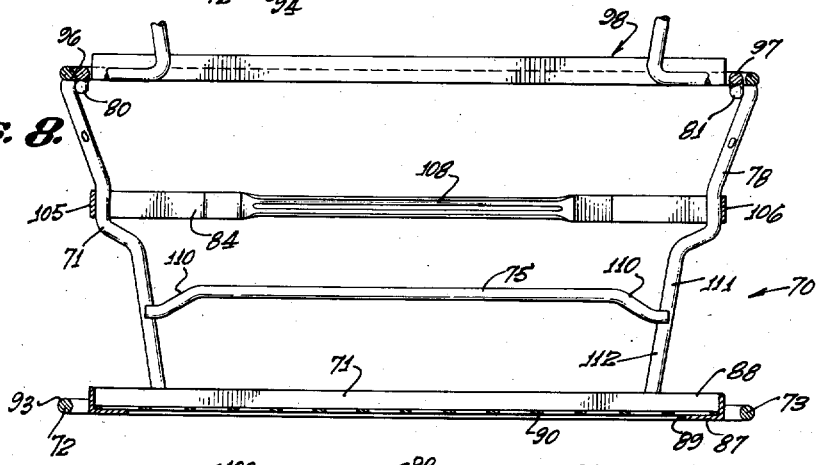
Fig. 8 is a sectional view taken along the line 8—8 of Fig. 7, with a portion of a second tray stacked on the first tray.

The upper end rails 80 and 81 have corresponding raised central portions 96 and 97, respectively, which are spaced apart a distance slightly greater than the over-all end-to-end dimension of the bottom 71. The lower end rails 72 and 73 are spaced from the bottom 71 a distance slightly greater than the thickness of the central portions 96 and 97 of the top end rails so that when a second tray 98 is stacked on top of the first tray 70 with the side arms of the U-shaped lower end rails of the upper tray resting on the upper end rails of the lower tray, the raised portions 96 and 97 of the lower tray will be positioned in the spaces between the lower end rails and the bottom of the upper tray, as seen in Fig. 8.

The raised central portion 97 of the upper end rail 81 has shoulders 100, 101 at each end thereof, respectively, spaced so that the distance across the shoulders is slightly less than the distance between the side arms of the U-shaped lower end rail 73. The upper end rail 80 is provided with similar shoulders 102, 103. When the upper tray 98 is stacked on the lower tray 70, as shown in Figs. 8 and 9, the positioning of the central portions 96 and 97 in the spaces between the lower end rails and the bottom serves to center and interlock the upper tray on the lower tray both sidewise and endwise, thereby providing a rigid vertically aligned stack.

Figure 9:
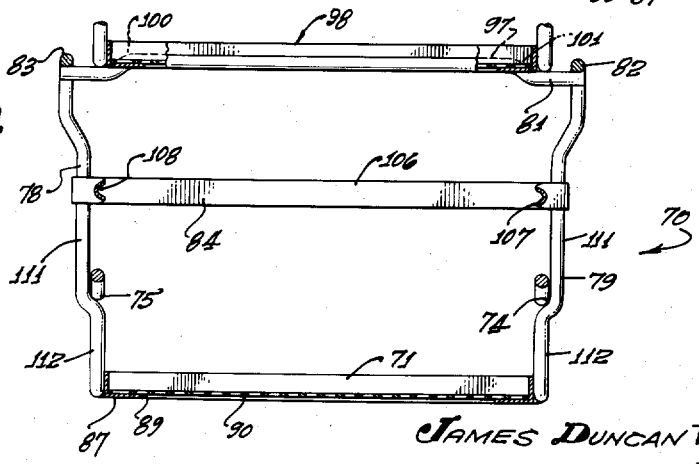
Fig. 9 is a sectional view taken along the line 9—9 of Fig. 7, with a portion of a second tray stacked on the first tray.

As best seen in Fig. 9 the inner surfaces of opposing ends 105, 106 and opposing side sections 107, 108 of the intermediate band 84 are positioned above and in vertical alignment with the outer surfaces of the upturned edge 88 of the bottom 71 to define a vertically extending space of rectangular cross section within the tray in which a plurality of rectangular or square-shaped cartons or the like can be snugly packed.

Figure 7:
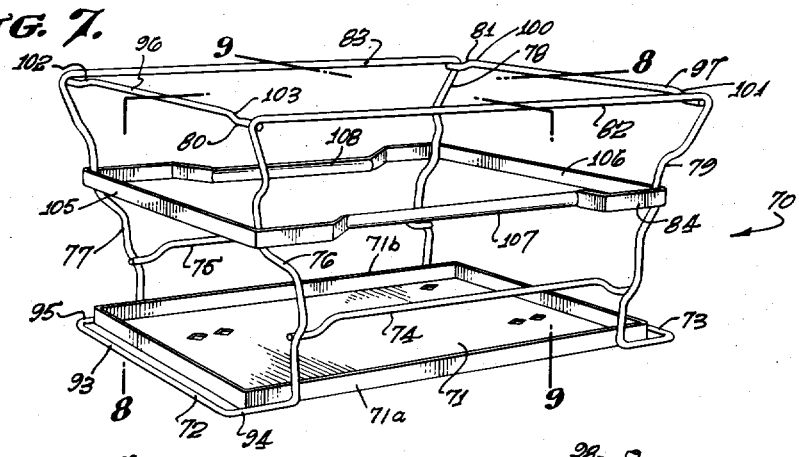
Fig. 7 is an isometric view of an alternative embodiment of the invention.
Figure 10:
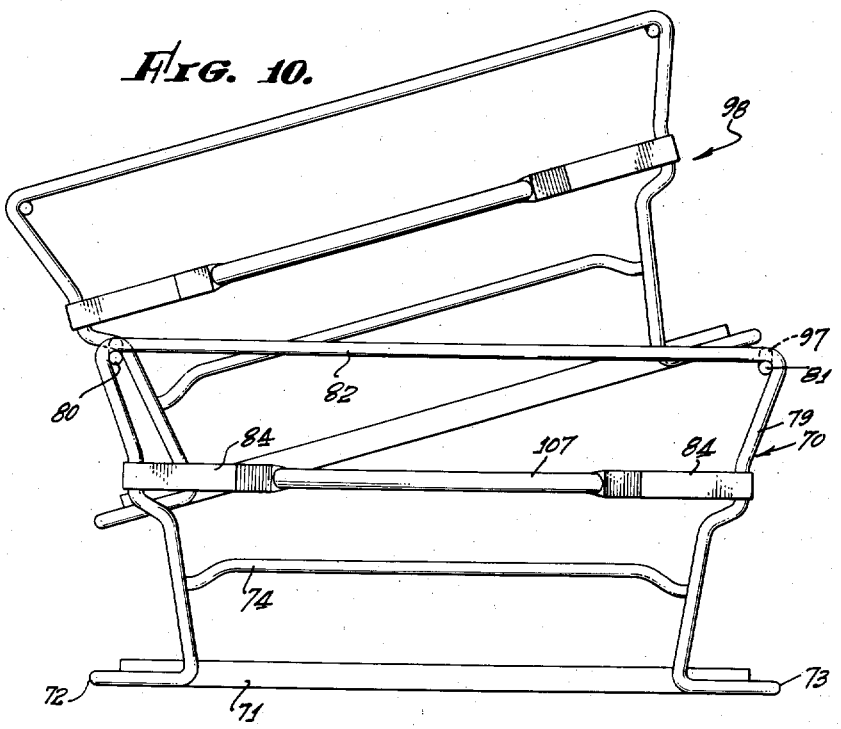
Fig. 10 is a side view showing the tray of Fig. 7 being nested with an identical tray.
Figure 11:
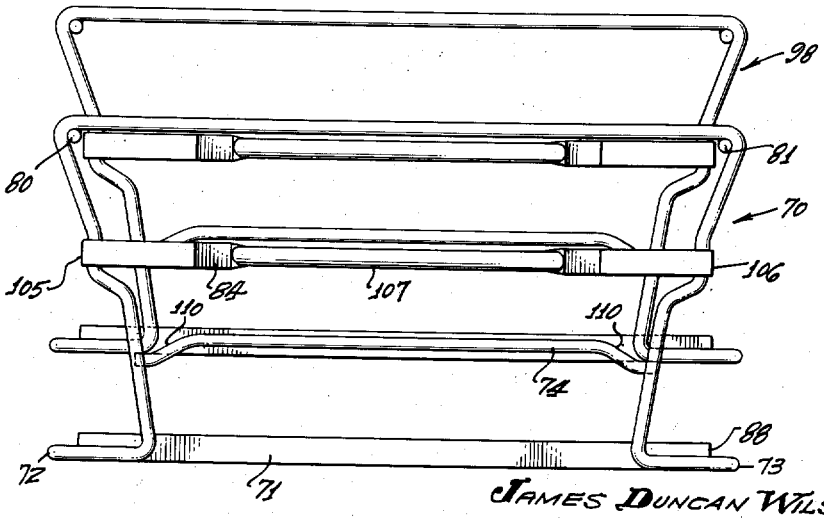
Fig. 11 is a side view showing two trays of the embodiment of Fig. 7 nested together.

Trays which are constructed according to the embodiment of Fig. 7 may be nested in the same manner as those described in conjunction with Fig. 1, the nesting operation being shown partially completed in Fig. 10 and completed in Fig. 11. When nested, the upper tray 98 rests on the ends of the lower side rails 74, 75 of the lower tray 70, the lower rails 74, 75 having raised shoulders 110 adjacent each end thereof with the distance over the shoulders on each of the side rails being slightly less than the distance between the lower ends of the vertical members which rest on the ends of the lower side rails of the tray nested below. Referring to Fig. 9, a portion 111 of each vertical member is offset outward from a lower portion 112 a distance slightly greater than the width of the vertical member so that when one tray is nested within another, the upper tray will be centered side-to-side between the portions 111 of the vertical members. Thus the nested trays are aligned and interlocked both sidewise and endwise.

Another means for end-to-end centering of nested trays is also provided in the embodiment of Figs. 7 to 11. The intermediate band 84 is positioned vertically so that when one tray is nested with another, the ends 105, 106 of the intermediate band will occupy the same horizontal plane as the upper end rails 80, 81 of the next tray below (Fig. 11). Since the ends 105, 106 are in vertical alignment with the edge 88 of the bottom 71 and since the distance between the upper end rails 80, 81 is made slightly greater than the end-to-end dimension of the bottom, the intermediate band 84 maintains the nested trays in endwise alignment.

The relative distances between the upper end rails and the bottom and the lower side rails and the bottom may be selected in the same manner as described in conjunction with the embodiment of Fig. 1, so that a plurality of the trays of the embodiment of Fig. 7 may be nested together with the upper trays resting on the side rails of the next lower tray and also on the end rails of the nth lower tray, where n is a small whole number.

Although exemplary embodiments of the invention have been disclosed and discussed, it will be understood that other applications of the invention are possible and that the embodiments disclosed may be subjected to various changes, modification and substitutions without necessarily departing from the spirit of the invention.

I claim as my invention:

1. In a tray adapted to be stacked with or nested with a plurality of identical trays and comprising a tray bottom unit having spaced opposite ends and spaced opposite sides, an open tray top unit disposed above said tray bottom unit and comprising spaced opposite ends and spaced opposite sides which extend between said last-mentioned ends and define therewith an opening, said ends of the tray top unit being positioned closer to each other than said ends of the tray bottom unit, whereby when two such trays are stacked together the tray bottom unit of the upper tray rests on top of the ends of the tray top unit of the lower tray, said sides of the tray bottom unit being positioned closer to each other than said sides of the tray top unit to permit nesting of said trays with one another, and rigid members connecting said tray bottom unit to said tray top unit at the respective sides thereof, said rigid members having portions which extend down from the tray top unit and are disposed laterally outward from the respective sides of the tray bottom unit so as to permit the tray bottom unit of an upper tray to be inserted down toward the tray bottom unit of a lower tray when said trays are being nested together, said rigid members being connected to the tray bottom unit inward from the latter's ends an amount sufficient to permit one end of the tray bottom unit of an upper tray to be inserted under the corresponding end of the tray top unit of a lower tray and the opposite end of the tray bottom unit of said upper tray moved down inside the opposite end of the tray top unit of said lower tray when said trays are being nested together, the improvement which comprises: support members at the respective opposite sides of the tray which are spaced above the tray bottom unit and below the tray top unit and are positioned for engagement with one of said units on the next adjacent tray when the trays are nested together, said support members being disposed at a level above the tray bottom unit sufficient to maintain the tray bottom units of successive nested trays spaced from one another.

2. The tray of claim 1 wherein said support members are disposed laterally inward from the respective sides of the tray bottom unit to provide supports for the tray bottom unit of the next higher tray when the trays are nested together.

3. The tray of claim 1 wherein said support members present portions which are disposed substantially directly vertically above corresponding portions at the respective sides of the tray bottom unit and laterally inward from the respective sides of the tray top unit to provide supports for the tray bottom unit of the next higher tray when the trays are nested together.

*4. In a tray adapted to be stacked with or nested with a plurality of identical trays and comprising a tray bottom unit including supporting portions and having spaced opposite edges, an open tray top unit disposed above said tray bottom unit and comprising at least two spaced opposite edges, said edges of the tray top unit including supporting portions vertically aligned with corresponding ones of the supporting portions of the tray bottom unit, whereby when two such trays are stacked together the supporting portions of the trap bottom unit of the upper tray rest on top of corresponding ones of the supporting portions of the tray top unit of the lower tray, at least some of said edges of the tray bottom unit being positioned closer to each other than said edges of the tray top unit to permit nesting of said trays with one another, and rigid members connecting said tray bottom unit to said tray top unit at the respective edges thereof, said rigid members having portions which extend down from the tray top unit and are disposed laterally outward from the respective edges of the tray bottom unit so as to permit the tray bottom unit of an upper tray to be inserted down toward the tray bototm unit of a lower tray when said trays are being nested together, and support members at respective opposite edges of the tray which are spaced above the tray bottom unit and below the trap top unit and are positioned for engagement with one of said units on the next adjacent tray when the trays are nested together, said support members being disposed at a level above the tray bottom unit sufficient to maintain the tray bottom units of successive nested trays spaced from one another.*

*5. The tray of claim 4 wherein said support members are disposed laterally inward from the respective edges of the tray bottom unit to provide supports for the tray bottom unit of the next higher tray when the trays are nested together.*

References Cited in the file of this patent or the original patent

| | | |
|---|---|---|
| 1,955,236 | Jarvis | Apr. 17, 1934 |
| 2,662,662 | Moorhead | Dec. 15, 1953 |
| 2,782,936 | Lockwood | Feb. 26, 1957 |